(12) United States Patent
Bhowmik et al.

(10) Patent No.: US 9,465,748 B2
(45) Date of Patent: Oct. 11, 2016

(54) INSTRUCTION FETCH TRANSLATION LOOKASIDE BUFFER MANAGEMENT TO SUPPORT HOST AND GUEST O/S TRANSLATIONS

(75) Inventors: Prasanta K. Bhowmik, Fort Collins, CO (US); Douglas B. Hunt, Fort Collins, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 971 days.

(21) Appl. No.: 13/341,313

(22) Filed: Dec. 30, 2011

(65) Prior Publication Data

US 2013/0173882 A1   Jul. 4, 2013

(51) Int. Cl.
*G06F 12/02* (2006.01)
*G06F 12/10* (2016.01)

(52) U.S. Cl.
CPC .................................. *G06F 12/1036* (2013.01)

(58) Field of Classification Search
None
See application file for complete search history.

(56) References Cited

U.S. PATENT DOCUMENTS

| | | |
|---|---|---|
| 5,809,522 A | 9/1998 | Novak et al. |
| 7,552,254 B1 | 6/2009 | George et al. |
| 7,552,255 B1 * | 6/2009 | George et al. ................. 710/58 |
| 2004/0098559 A1 | 5/2004 | Masui |
| 2008/0016315 A1 * | 1/2008 | Cohen et al. ................ 711/207 |
| 2008/0320216 A1 | 12/2008 | Fertig et al. |
| 2010/0313201 A1 | 12/2010 | Warton et al. |
| 2011/0125952 A1 * | 5/2011 | Brandt et al. .................... 711/6 |
| 2011/0238947 A1 | 9/2011 | Nishiguchi et al. |

* cited by examiner

*Primary Examiner* — Charles Rones
*Assistant Examiner* — Ryan Dare
(74) *Attorney, Agent, or Firm* — Volpe and Koenig, P.C.

(57) ABSTRACT

A translation lookaside buffer (TLB) configured for use in a multiple operating system environment includes a plurality of storage locations, each storage location being configured to store a page translation entry configured to relate a virtual address range to a physical address range, each page translation entry having an address space identifier (ASID) associated with an operating system. The TLB also includes flush logic configured to receive a TLB flush request from an operating system having an operating system ASID and flush only TLB page translation entries having a stored ASID that matches the operating system ASID.

19 Claims, 11 Drawing Sheets

| | Virtual Address | Physical Address | Valid | ASID | |
|---|---|---|---|---|---|
| 202 | XXX | XXX | 1 | 10 | 222 |
| 204 | XXX | XXX | 1 | 12 | 224 |
| 206 | XXX | XXX | 1 | 10 | 226 |
| 208 | XXX | XXX | 1 | 13 | 228 |
| 210 | XXX | XXX | 1 | 10 | 230 |
| 212 | XXX | XXX | 1 | 12 | 232 |
| 214 | XXX | XXX | 1 | 10 | 234 |
| 216 | ... | ... | 0 | ... | 236 |

|  | Virtual Address | Physical Address | Valid | ASID |  |
|---|---|---|---|---|---|
| 202 | XXX | XXX | 1 | 10 | 222 |
| 204 | XXX | XXX | 0 | XXX | 224 |
| 206 | XXX | XXX | 1 | 10 | 226 |
| 208 | XXX | XXX | 1 | 13 | 228 |
| 210 | XXX | XXX | 1 | 10 | 230 |
| 212 | XXX | XXX | 0 | XXX | 232 |
| 214 | XXX | XXX | 1 | 10 | 234 |
| 216 | ... | ... | 0 | ... | 236 |

| Virtual Address 1 | Physical Address 1 | Valid 1 | ASID 1 |
|---|---|---|---|
| xxx | xxx | 1 | 11 |
| xxx | xxx | 1 | 12 |
| xxx | xxx | 1 | 14 |
| xxx | xxx | 1 | 13 |
| xxx | xxx | 1 | 10 |
| xxx | xxx | 1 | 15 |
| xxx | xxx | 1 | 12 |
| ... | ... | 0 | ... |

| Virtual Address 4 | Physical Address 4 | Valid 4 | ASID 4 |
|---|---|---|---|
| xxx | xxx | 1 | 10 |
| xxx | xxx | 1 | 12 |
| xxx | xxx | 1 | 10 |
| xxx | xxx | 1 | 13 |
| xxx | xxx | 1 | 10 |
| xxx | xxx | 1 | 12 |
| xxx | xxx | 1 | 10 |
| ... | ... | 0 | ... |

FIG. 5a

| Virtual Address 1 | Physical Address 1 | Valid 1 | ASID 1 |
|---|---|---|---|
| xxx | xxx | 1 | 11 |
| xxx | xxx | 0 | xx |
| xxx | xxx | 1 | 14 |
| xxx | xxx | 1 | 13 |
| xxx | xxx | 1 | 10 |
| xxx | xxx | 1 | 15 |
| xxx | xxx | 0 | xx |
| ... | ... | 0 | ... |

| Virtual Address 4 | Physical Address 4 | Valid 4 | ASID 4 |
|---|---|---|---|
| xxx | xxx | 1 | 10 |
| xxx | xxx | 0 | xx |
| xxx | xxx | 1 | 10 |
| xxx | xxx | 1 | 13 |
| xxx | xxx | 1 | 10 |
| xxx | xxx | 0 | xx |
| xxx | xxx | 1 | 10 |
| ... | ... | 0 | ... |

INSTRUCTION FETCH TRANSLATION LOOKASIDE BUFFER MANAGEMENT TO SUPPORT HOST AND GUEST O/S TRANSLATIONS

FIELD OF INVENTION

This invention relates to apparatus and methods for virtual memory management.

BACKGROUND

A typical central processing unit (CPU) uses cache memory to reduce the average memory access time. A cache memory is a smaller, faster memory that is disposed between the CPU and main memory. The cache memory stores copies of data from frequently used main memory locations. When the CPU needs to access main memory it first checks whether a copy of the required data is in the cache. If so, the CPU immediately reads from, or writes to, the cache. This improves latency since cache memory access times are faster than main memory access times.

Modern CPUs can have at least three independent caches: an instruction cache to speed up executable instruction fetches, a data cache to speed up data fetches and stores, and a translation lookaside buffer (TLB) used to speed up virtual-to-physical address translation for both executable instructions and data. Various cache and TLB levels can also be used.

Following a context switch, it is necessary to flush the contents of the instruction or data TLB. In systems running multiple operating systems, a complete TLB flush is performed when any guest/host operating system requires a TLB flush. This can occur fairly often as a result of typical virtual memory management and leads to increased latency.

SUMMARY OF EMBODIMENTS

A translation lookaside buffer (TLB) configured for use in a multiple operating system environment includes a plurality of storage locations, each storage location being configured to store a page translation entry configured to relate a virtual address range to a physical address range, each page translation entry having an address space identifier (ASID) associated with an operating system. The TLB also includes flush logic configured to receive a TLB flush request from an operating system having an operating system ASID and flush only TLB page translation entries having a stored ASID that matches the operating system ASID.

The page translation entries may be stored in a content-addressable memory (CAM) format or an indexed format. The indexed format may be an n-way associative format (e.g., a 4-way associative format). The ASID may be a multi-bit field having a plurality of values. The TLB may be configured with a first level and second level. The first level TLB may be a CAM format and the second level may be an indexed format.

The TLB may include insert logic configured to insert a page translation entry including an ASID. The insert logic may be configured to insert page translation entries in a content-addressable memory format. The insert logic may also be configured to insert page translation entries in an indexed format.

DETAILED DESCRIPTION OF THE EMBODIMENTS

Physical memory space refers to the actual size of operating memory installed. Virtual memory is imaginary (or functional) memory space that is made available to software tasks. In a typical system, most tasks are allocated some virtual memory which is mapped onto physical memory. Both virtual and physical memory spaces use pages for addressing. Virtual pages are often 4 Kb or 8 Kb, though larger sizes may be also supported such as 2 Mb or 4 Mb. A translation lookaside buffer (TLB) provides a mechanism to translate between virtual addresses and physical addresses.

Figure 1:
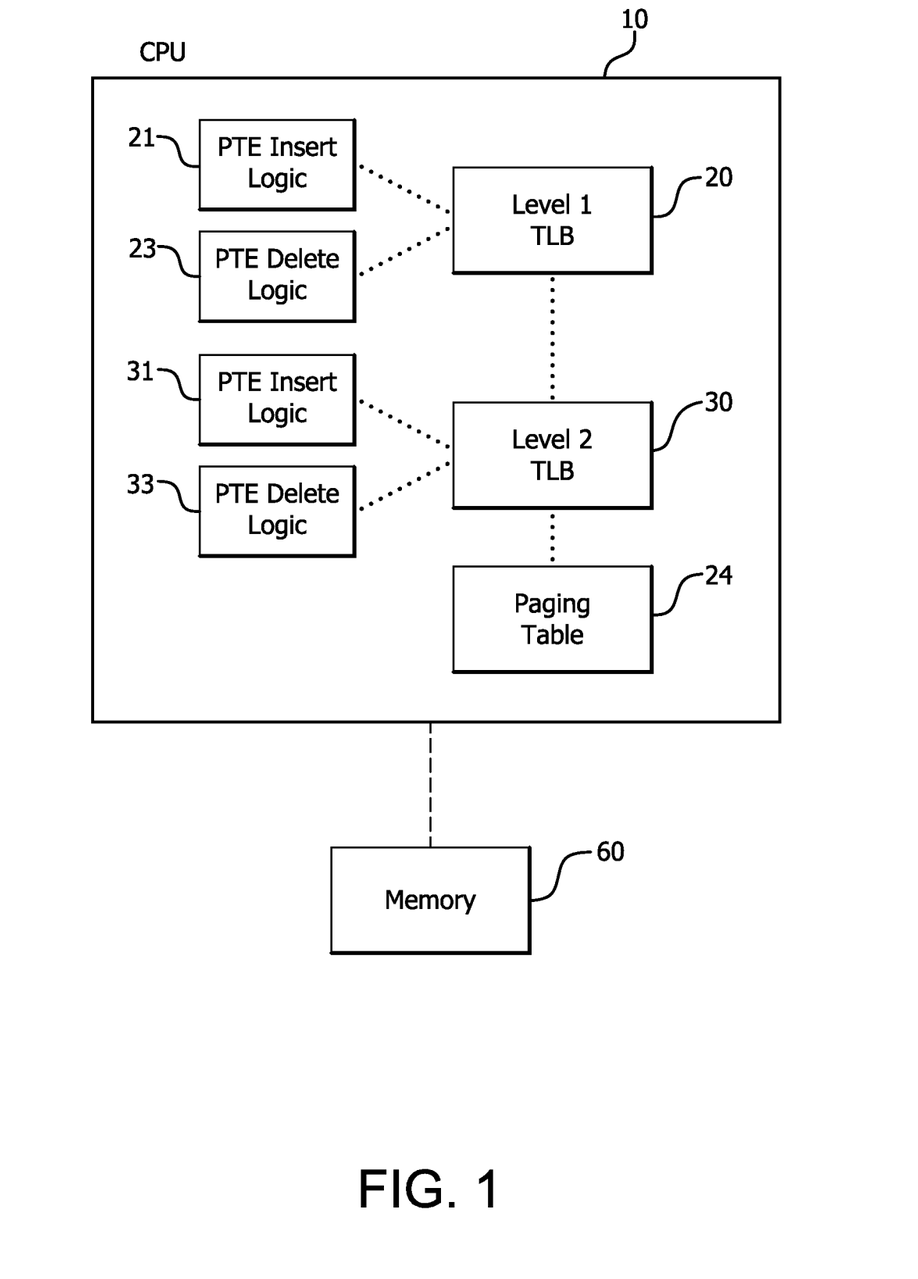
FIG. 1 is a block diagram of a CPU with a level 1 and level 2 TLB.

FIG. 1 is a block diagram of a central processing unit (CPU) with a level 1 TLB 20, level 2 TLB 30, paging table 24 and attached memory 60. Level 1 TLB 20 has page translation entry insert logic 21 and delete logic 23. Level 2 TLB 30 has page translation entry insert logic 31 and delete logic 33. It should be understood that such circuitry may be located on the CPU die or may be located elsewhere. This example includes a level 1 TLB 20 and a level 2 TLB 30.

It should be understood that a single level or additional levels can be used without departing from the scope of this disclosure. It should be understood that CPU 10 can also include various cache structures for data and instructions that work in concert with TLBs to reduce memory latency.

Suitable processors for CPU 10 include, by way of example, a general purpose processor, a special purpose processor, a conventional processor, a digital signal processor (DSP), a plurality of microprocessors, a graphics processing unit (GPU), a DSP core, a controller, a microcontroller, application specific integrated circuits (ASICs), field programmable gate arrays (FPGAs), any other type of integrated circuit (IC), and/or a state machine, or combinations thereof.

Typically, CPU 10 receives instructions and data from a memory, shown as memory 60. This memory may be read-only memory (ROM), a random access memory (RAM), and/or another type of storage device. Storage devices suitable for embodying computer program instructions and data include all forms of non-volatile memory, including by way of example, semiconductor memory devices, magnetic media such as internal hard disks and removable disks, magneto-optical media, and optical media such as CD-ROM disks and DVDs. Examples of computer-readable storage mediums also may include a register and cache memory. In addition, the functions within the illustrative embodiments may alternatively be embodied in part or in whole using hardware components such as ASICs, FPGAs, or other hardware, or in some combination of hardware components and software components.

Figure 2:
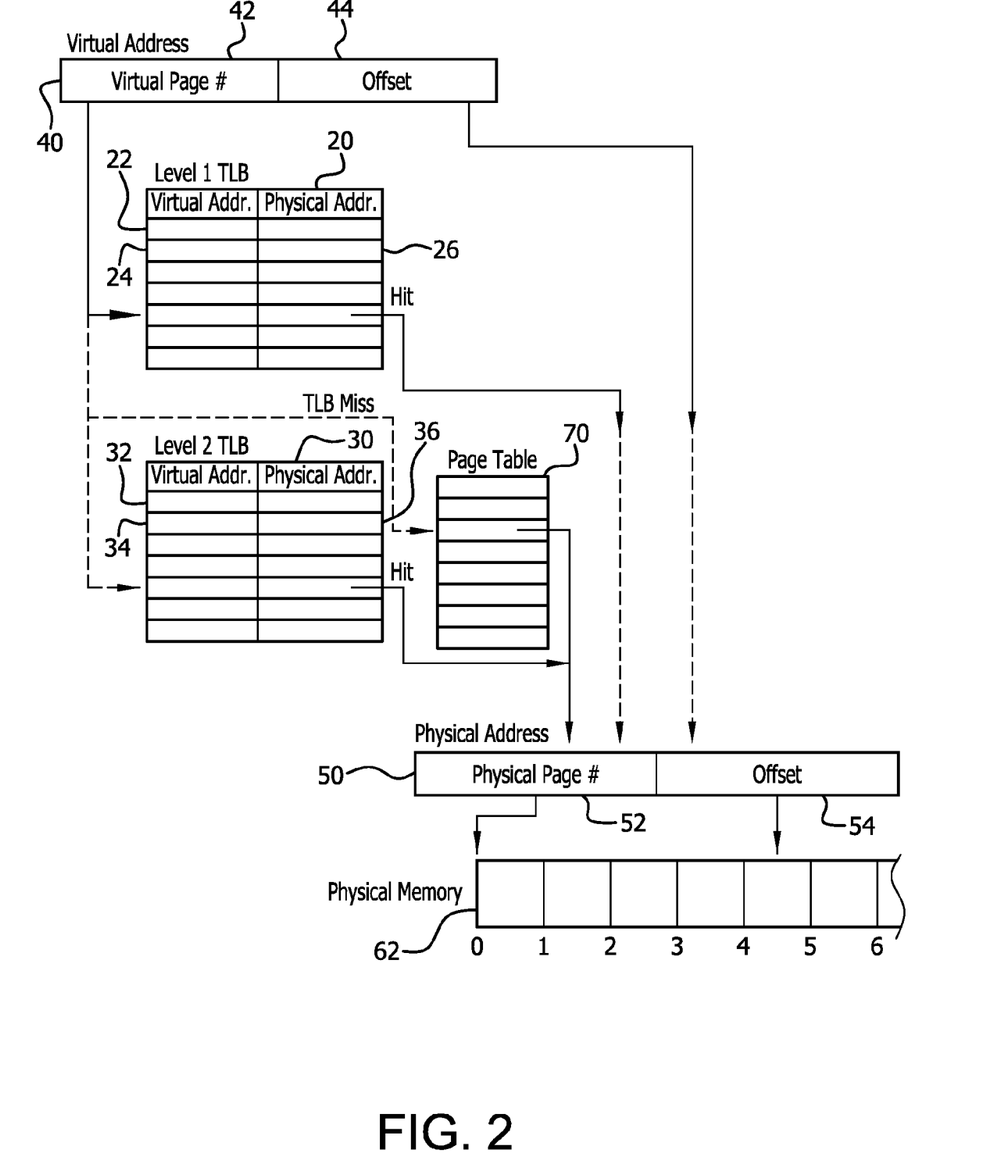
FIG. 2 is a two level TLB block diagram.

FIG. 2 is a block diagram of an example two level TLB. It should be understood that the level 1 and level 2 TLBs may use different internal structures. For example, the level 1 TLB 20 may be implemented as content-addressable memory (CAM). The level 2 TLB 30 may be implemented using an indexed structure (e.g. n-way associative structure). Each TLB generally includes a plurality of page translations entries 22, 32. Each page translation entry may be used to relate a virtual address range to a physical address range.

A virtual address 40 may include a virtual page number 42 and an offset 44. The virtual page number 42 is used in searching for a corresponding TLB page translation entry 22, 32. Each page translation entry includes a virtual address 24, 34 and a physical address 26, 36.

In order to access an instruction or data using a virtual address 40, the level 1 TLB 20 is searched for a page translation entry 22 with a virtual address 24 that matches the virtual page number 42. If a match is found, the corresponding physical address 26 is retrieved. The physical address 26 generally corresponds to a range of physical memory addresses. The physical address 26 generally includes the physical page number 52 and an offset 54. The offset 54 generally corresponds to offset 44 and is used to index within a physical memory range to locate the specific instruction or data stored in the desired memory location. Physical memory 62 may be an attached memory device 60 or may be a cache memory located within the CPU 10 or elsewhere.

The level 1 TLB 20 can be implemented with a lower latency access time and level 2 TLB 30 is implemented with higher latency access time. If the virtual page number 42 is not found within the level 1 TLB 20, the level 2 TLB 30 is searched. The level 2 TLB 30 is searched for a page translation entry 32 with a virtual address 34 that matches the virtual page number 42. If a match is found, the physical address 36 is retrieved. The physical address 36 generally corresponds to a range of physical memory addresses. As described hereinbefore, the physical memory address generally includes the physical page number 52 and an offset 54, where offset 54 generally corresponds to offset 44. If no match is found in the level 1 TLB 20 or level 2 TLB 30, a page table 70 or other structure may be used to resolve the physical address. Such structures typically have a higher latency then the level 1 TLB 20 or level 2 TLB 30. Such structures are also well known to those of skill in the art and thus will not be described in detail herein.

In systems running multiple operating systems, each time a context switch takes place, it is necessary to flush the contents of the level 1 TLB 20 and the level 2 TLB 30. Typically, a complete TLB flush is performed when any guest/host operating system requires a TLB flush. This may occur fairly often as a result of virtual memory management and leads to increased memory latency.

Figure 3:
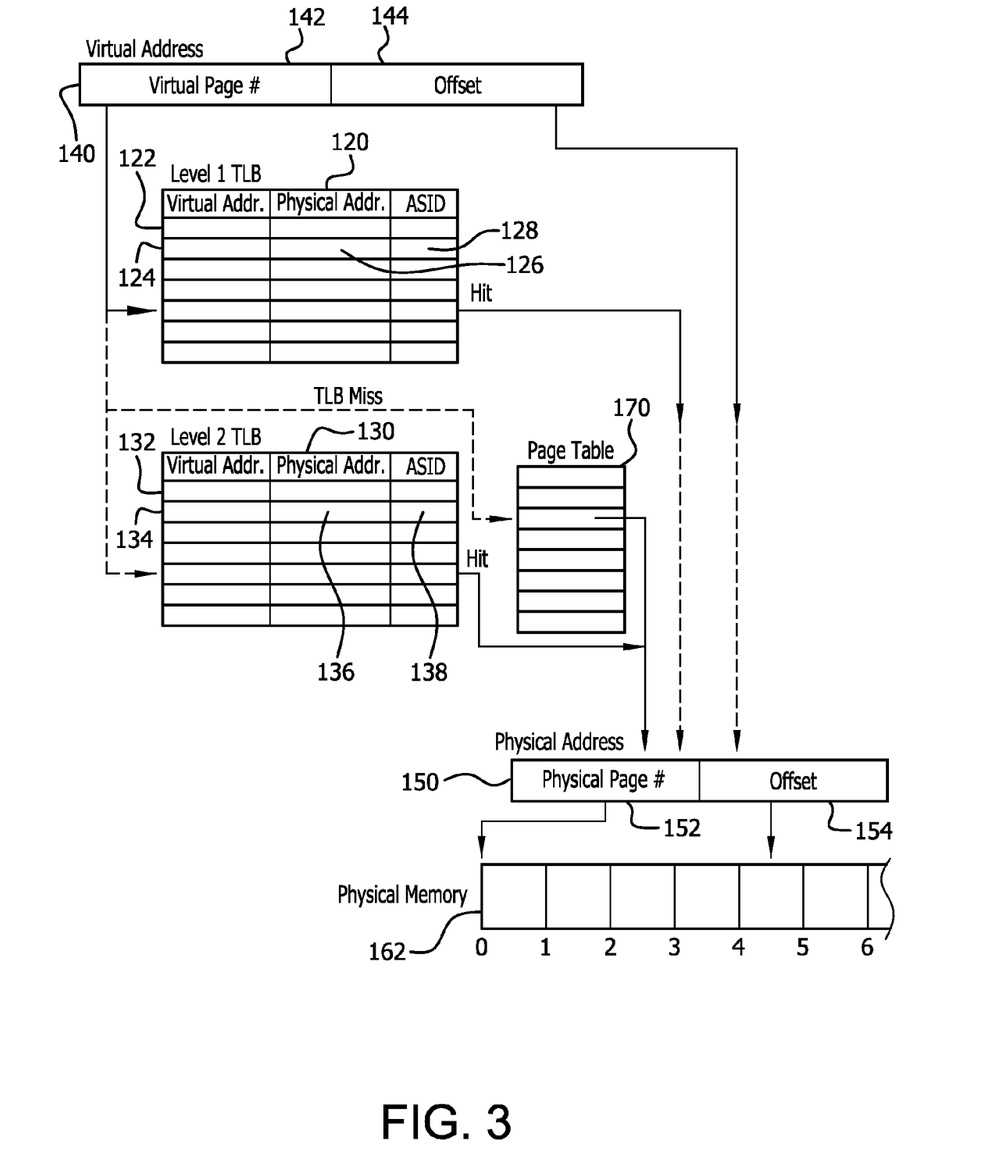
FIG. 3 is a block diagram of a TLB structure including an address space identifier (ASID)

FIG. 3 is a block diagram of a TLB structure including an address space identifier (ASID). The ASID is a multi-bit field. For example, the ASID may be a 4 bit field having a total of 16 possible values. One ASID value is assigned to each operating system or virtual environment in a multi-operating system environment. Although noted hereinafter as being implemented in a multi-operating system environment wherein the ASID is associated with a particular operating system, the teachings herein have broader applicability. For example, due to hardware and software virtualization, the ASID may be associated with a plurality of virtual environments including a plurality of virtual machines or virtual machine managers, a plurality of hypervisors, a plurality of virtual operating platforms or the like. Each page translation entry in the TLB has a storage location for an ASID to identify the specific operating system that inserted the entry.

This example includes a level 1 TLB 120 and a level 2 TLB 130. As described above, a single TLB level or additional levels may be used without departing from the scope of this disclosure. The level 1 and level 2 TLBs 120, 130 may use different internal structure. For example, the level 1 TLB 120 may be implemented as content-addressable memory (CAM). The level 2 TLB 130 may be implemented using an indexed structure. Each TLB generally includes a plurality of page translations entries 122, 132. Each page translation entry may be used to relate a virtual address range to a physical address range.

A virtual address 140 may include a virtual page number 142 and an offset 144. The virtual page number 142 is used in searching for a corresponding TLB page translation entry 122, 132. In a multi-operating system environment each host or guest operating system is assigned a unique ASID. Each page translation entry includes a virtual address 124, 134, a physical address 126, 136 and an ASID 128, 138. Each page translation entry 122, 132 is therefore uniquely associated with the specific host or guest operating system that created the entry.

In order to access an instruction or data from a virtual address 140, the level 1 TLB 120 is searched for a page translation entry 122 with a virtual address 124 that matches the virtual page number 142. If no match is found, the level 2 TLB 130 is searched. If no match is found in the level 2 TLB 130, a page table 170 or other structure may be used to resolve the physical address as discussed above. As will be described in detail hereinafter, the ASID must match on an instruction or data fetch in order for the translation to be used or during a data flush in order for that portion of the memory to be flushed.

Figure 4A:
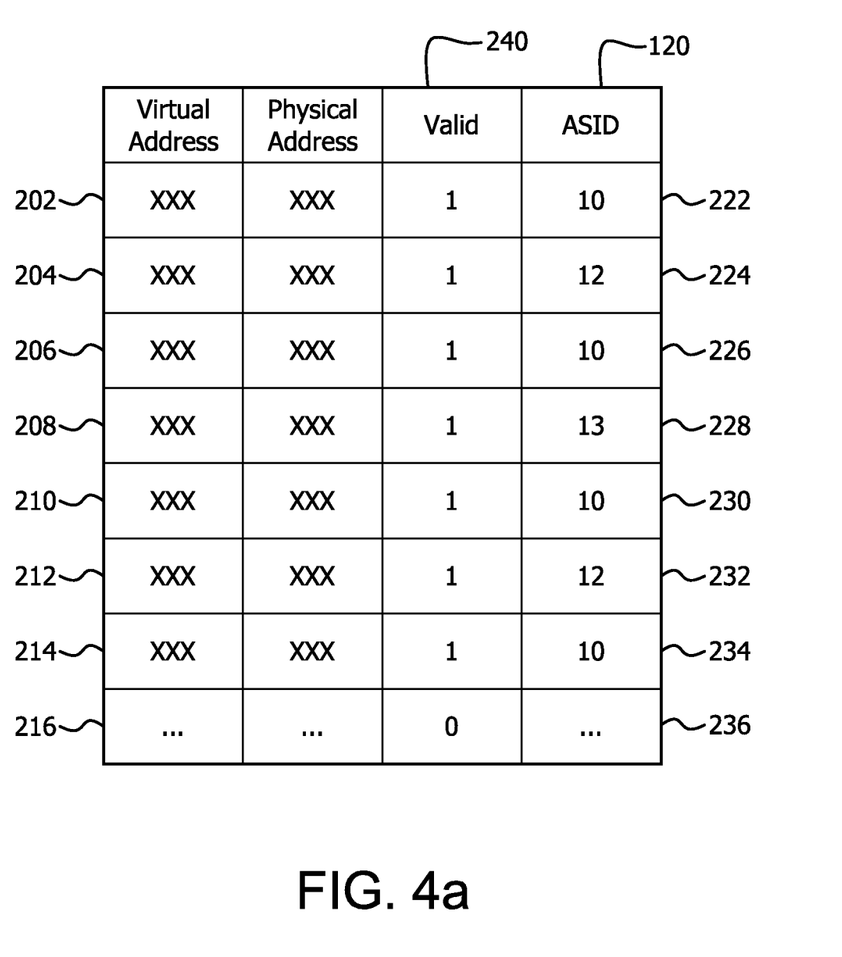
FIG. 4a is a block diagram of a CAM TLB structure prior to a flush operation.

FIG. 4a is a block diagram of a CAM level 1 TLB 120 structure prior to a flush operation. As described hereinbefore, the level 1 and level 2 may be CAM based (i.e., fully associative) or N-way set associative. Therefore FIGS. 4a and 4b and 5a and 5b could correspond to either level 1 or level 2 TLBs since either level could be implemented as either type. The level 1 TLB 120 includes a plurality of page translation entries 202-216. Each page translation entry has a corresponding ASID 222-236. Each page translation entry 202-216 also has a valid bit shown generally by reference number 240, configured to indicate whether the page translation entry contains valid data. In a context switch scenario (a given operating system, e.g., identified by ASID 12) may request a TLB flush. Only valid page translation entries having an ASID of 12 are flushed, (e.g., in FIG. 4a shown as page translation entries 204 and 212). The remaining valid entries with non-matching ASIDs remain in the level 1 TLB 120. It would be understood by those of skill in the art that use of a valid bit is not required for implementing an ASID. Accordingly, in another embodiment, the valid bit is not utilized, and only comparisons to the ASID of each page translation entry 202-216 are made.

Figure 4B:
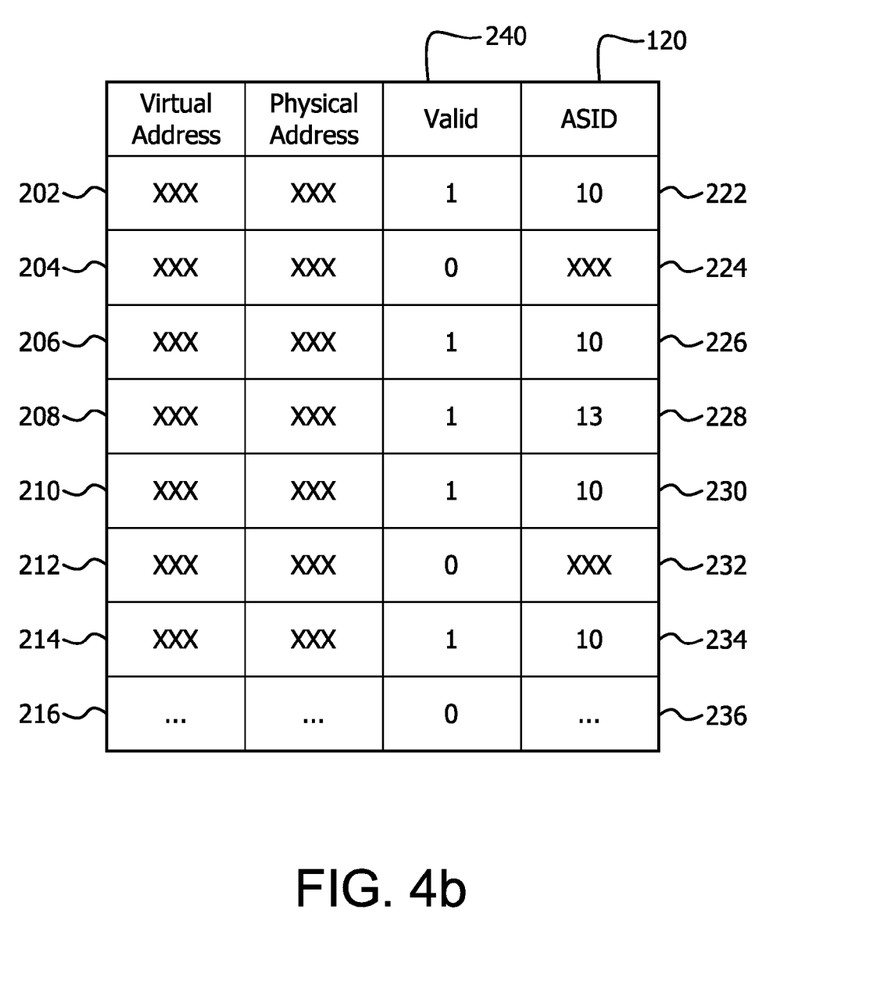
FIG. 4b is a block diagram of a CAM TLB structure following a flush operation.

FIG. 4b is a block diagram of a CAM level 1 TLB 120 structure following a flush operation. The valid page translation entries having an ASID of 12 are flushed (e.g., page translation entries 204 and 212). These entries have valid bits with a value of logical zero. These page translation entries are now available for new data. It should be noted when referring to FIGS. 4b and 5b, only the valid bits in FIGS. 4b and 5b actually need to change (i.e. they are switched from 1 to 0 as shown in the diagram. The stored ASID values may remain as they are, as it is not necessary for the ASID field 120 to be cleared on a TLB flush; only the valid bit field needs to be cleared. The term "xxx" has been used in the figures to denote that the information is irrelevant.

Figure 5A:
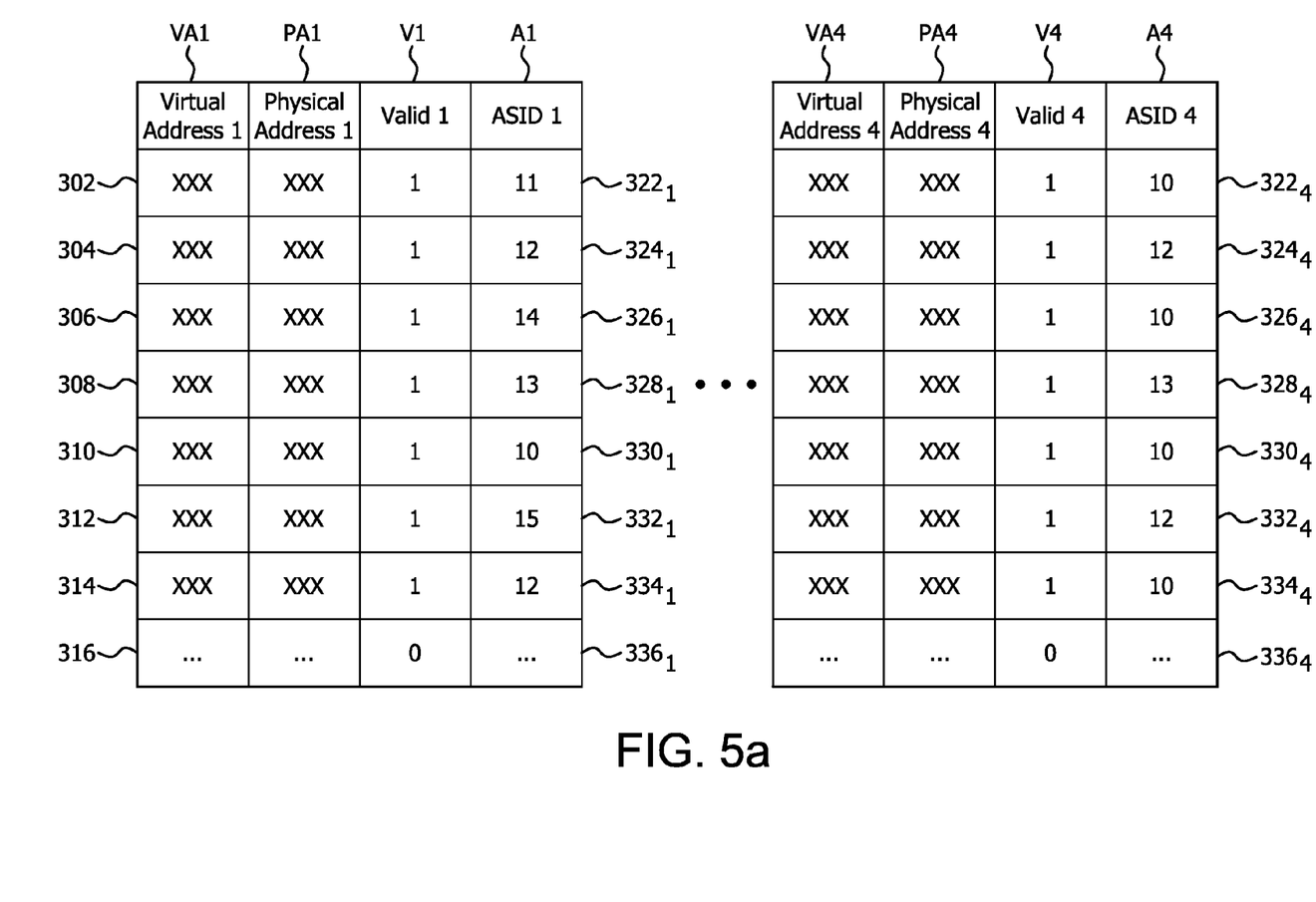
FIG. 5a is a block diagram of an indexed TLB structure prior to a flush operation.

FIG. 5a is a block diagram of an indexed level 2 TLB 130. In this example, TLB 130 is implemented as a 4-way associative level 2 TLB. A set-associative structure is a way that a given virtual address will only be stored in one of the locations of a specific set determined by decoding part of the virtual address. Therefore, only one set has to be accessed for a given instruction or data fetch operation. The concept of a set associative cache and how it functions is well understood by those skilled in the art.

By way of example, however, consider a situation where a 64-bit virtual address must be translated. With a 4K-byte page, the low order 12-bits (bits [11:0]) designate the address of the byte within the page, so they are not translated by the TLB. A virtual page number/address VA (bits 63:12) can be associated with a physical page number/address PA (bits 63:12).

For a simple case, consider a 4-way set associative cache containing 1024 entries. The cache can hold the translations for 1024 different pages at the same time. A 4-way set-associative cache will have 256 different sets of four elements each. Typically, the low-order bits are used to index into the TLB, and 8-bits are used to select one of 256 entries—accordingly bits 19:12 of the VA would be the bits used to index into the TLB. The "tag" of a given entry is the rest of the VA, (i.e. bits 63:20). This is the Virtual Address field indicated in the Figures. To perform a lookup in the TLB, bits 19:12 of the VA are used to index, and bits 63:20 of the VA are compared with each of the four VA's stored at the index pointed to by bits 19:12 of the VA. If any of those stored VA (tags) match the VA we are being searched for, the corresponding bits 63:12 of the PA stored in the TLB refer to the physical page number that is wanted. Note that only bits 63:20 of the VA must be stored since all the addresses stored in a given set have the same bits 19:12 of the VA; (that's how they got to be there, since that is the index.) Thus, bits 63:12 of the VA==0x12345A and bits 63:12 of the VA==0x987ABC5A will be stored in the same set since they have the same bits 19:12 of the VA==5A.

The TLB 130 includes a plurality of sets 302-316. Each set 302-306 is comprises four entries. In FIG. 5A, the four entries included in set 302 are designated $322_1$ through $322_4$. Each of these entries is comprised of a Virtual Address (VA) field, a Physical Address (PA) field, a Valid bit (V) field and an ASID (A) field. As shown, a portion of the virtual address to be translated is decoded and used to select one "set" from the TLB 130 (this is where the term n-way set associative comes from).

As an example, virtual address 1 (VA1) is associated with physical address 1 (PA1), valid bit 1 (V1), and ASID 1 (A1). The 4 entries $322_1$-$322_4$ will share the same index which comes from a subset of the virtual address. The valid bits V1-V4 are configured to indicate whether the corresponding virtual address VA1-VA4 contains valid data. A comparison is then performed against the four virtual addresses contained in that set to see if there is a match. In addition, the ASID contained in each entry is compared against the ASID of the currently running OS. If the virtual address and the ASID fields match the virtual address to be translated and the ASID of the currently running OS, respectively, and the valid bit is set, the physical address contained in the Physical Address (PA) field is the desired physical address.

In a context switch scenario, a given operating system (e.g., ASID 12) may request a TLB flush. Only valid page translation entries having an ASID of 12 are flushed (e.g., page translation entries $324_1$, $324_4$, $332_4$, and $334_1$. The remaining valid entries with non-matching ASIDs remain in the level 2 TLB 130.

Figure 5B:
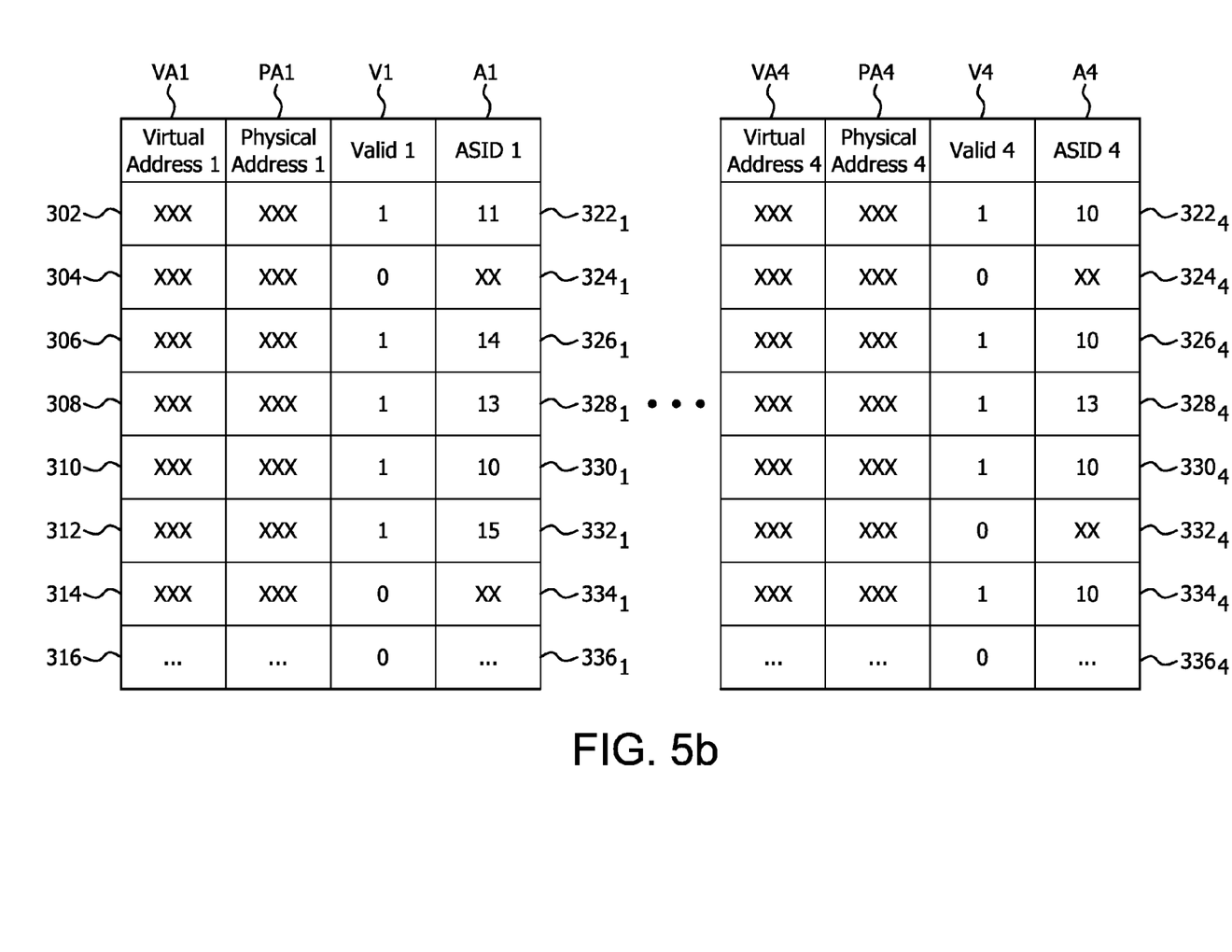
FIG. 5b is a block diagram of an indexed TLB structure following a flush operation.

FIG. 5b is a block diagram of an indexed level 2 TLB 130 structure following a flush operation. As shown, the valid page translation entries having an ASID of 12 have been flushed and are now invalid (e.g., page translation entries $324_1$, $324_4$, $334_1$ and $332_4$). These entries have valid bits with a value of logical zero. These page translation entries are now available for new data.

Figure 6A:
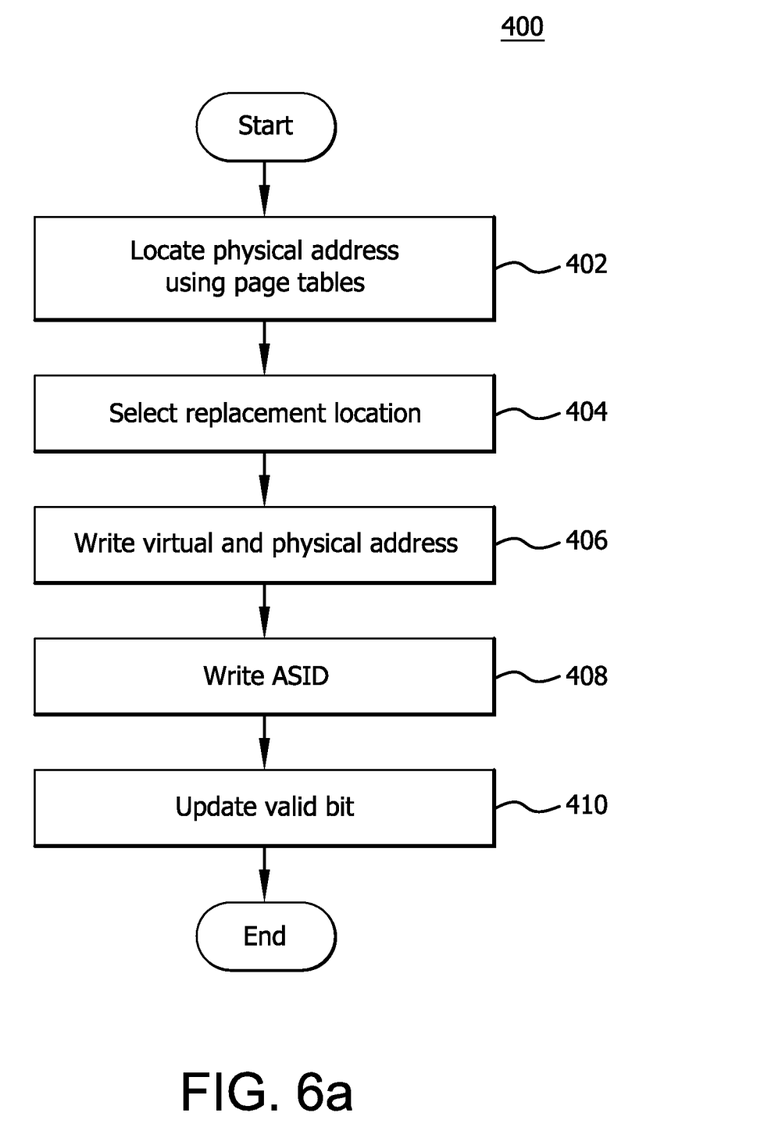
FIG. 6a is a flow diagram of page translation entry insert logic process which uses an ASID.

FIG. 6a is a flow diagram of page translation entry insert logic process 400 which uses an ASID. It should be understood that any flow diagrams contained herein are illustrative only and that other entry and exit points, time out functions, error checking functions and the like (not shown) would normally be implemented in a typical system. Any beginning and ending blocks are intended to indicate logical beginning and ending points for a given subsystem that can be integrated into a larger device and used as needed. The order of the blocks may also be varied without departing from the scope of this disclosure. Implementation of these aspects is readily apparent and well within the grasp of those skilled in the art based on the disclosure herein.

Typically, a page translation entry is inserted once a virtual address is correlated with a physical address (e.g., following a page table lookup), as shown by step 402. A replacement location is selected (step 404). In one embodiment, the first location in the TLB with invalid data is selected as the replacement location. The specific algorithm used to select a replacement location is not material to the subject of this invention and any suitable means of selection may be used. The virtual address and physical address are written to the page translation entry as shown by step 406, and the ASID associated with the current operating system is written to the page translation entry as shown by step 408. The valid bit is set to a logical 1 to indicate that the page translation entry has valid data as shown by step 410.

Figure 6B:
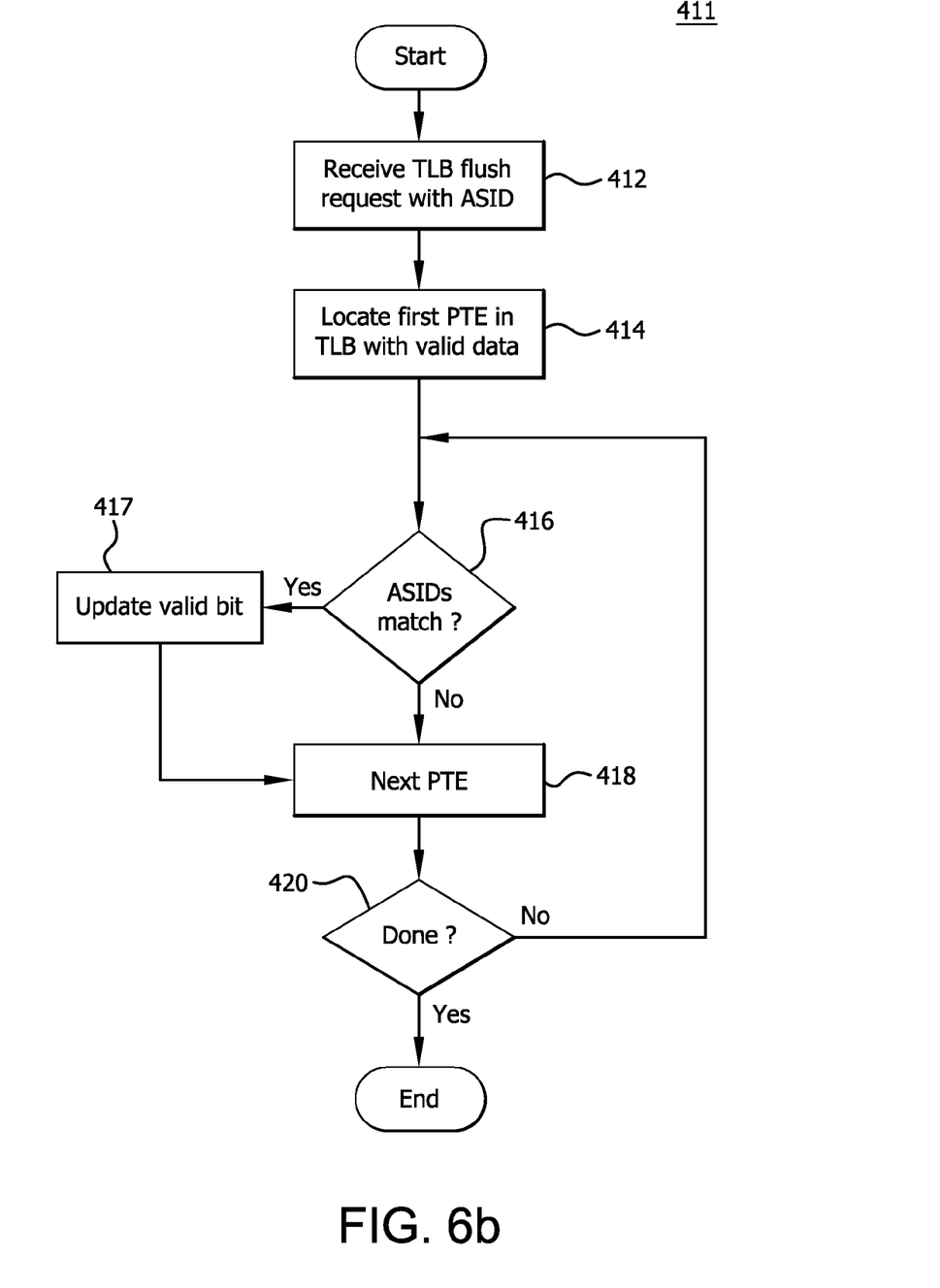
FIG. 6b is a flow diagram of page translation entry delete logic configured to use an ASID.

FIG. 6b is a flow diagram of page translation entry delete logic process 411 which uses an ASID. The current operating system, with an associated ASID, requests a TLB flush as shown by step 412. The first location in the TLB with valid data is located as shown by step 414. If the page translation entry ASID matches the ASID of the current operating system, the page translation entry is marked as invalid as shown by step 417. If the page translation entry ASID does not match the ASID of the current operating system, no changes are made. The logic is then updated to point to the next page translation entry as shown by step 418. If there are more entries in the TLB as determined by a negative determination step 420, the process 411 returns to step 416, otherwise the flush is complete as shown by an affirmative determination by step 420. It should be understood that the insert and delete logic can be modified to support various TLB structures including CAM and indexed structures.

Figure 7A:
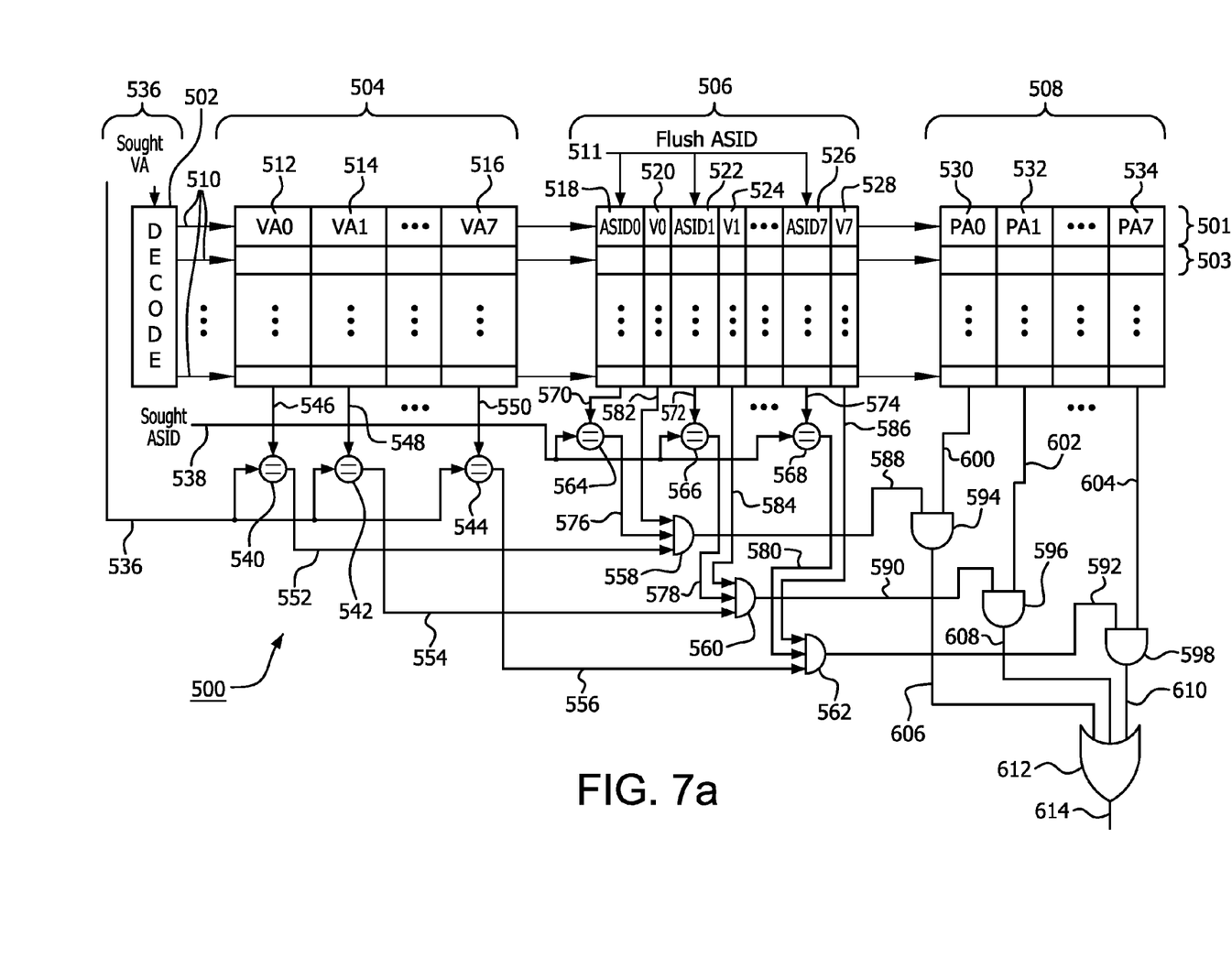
FIG. 7a is a block diagram of an indexed TLB structure.

FIG. 7a is a block diagram of an example indexed TLB 500 including an ASID. In this example is shown an 8-way set-associative TLB. The structure disclosed in FIG. 7a contains a plurality of storage locations, each storage location being configured to store a page translation entry configured to relate a virtual address range to a physical address range, each page translation entry having an address space identifier (ASID) associated with an operating system.

As noted above, the ASID may be a multi-bit field. For example, the ASID may be a 4 bit field having a total of 16 possible values. One ASID value is assigned to each operating system in a multi-operating system environment. Each page translation entry 501, 503 (or row) in the TLB 500 has a storage location for an ASID to indentify the specific operating system that inserted the entry. Each entry 501, 503 consists of virtual addresses VA0-VA7, physical addresses PA0-PA7, ASID ASID0-ASID7, and valid bits V0-V7. Each entry 501, 503 corresponds to a set of 8 addresses which are selected by one of the plurality of select lines 510 driven by the decode logic 502.

The TLB 500 includes a decoder 502, a tag array 504, a CAM array 506 and a data array 508. The decoder 502 generally has a plurality of select lines 510 that are used to select a set of page translation entries 501, 503 or row from each of the tag array 504, CAM array 506 and data array 508. The decoder 502 decodes at least a portion of the sought virtual address and activates one of the select lines 510.

In this particular example, which should not be limiting, the TLB 500 is an 8-way associative structure. Accordingly, each array 504, 506, 508 is divided into 8 columns for storage of data. Each page translation entry 501 is generally stored in a corresponding row of arrays 504, 506 and 508. For matters of simplicity, only columns 0, 1 and 7 are shown. It should be understood that the number of columns can vary without departing from the scope of this disclosure. It should also be understood that the number of rows in each array 504, 506 and 508 is tied to the number of bits decoded by decoder 502. This can be selected depending on the number of TLB entries desired. For example, if a 3 bit decoder is used then each array 504, 506 and 508 will have 8 rows. For matters of simplicity, only a few rows are shown, e.g., 501, 503.

In this example, the tag array 504 stores 8 virtual addresses per row (also known as a set). Assume for this example, that the first set of page translation entries 501 is selected. This corresponds to virtual address 0 (VA0) 512, virtual address 1 (VA1) 514 through virtual address 7 (VA7) 516. The corresponding entry in the CAM array 506 stores the corresponding 8 ASIDs and valid bits shown as ASID0, V0 (518,520), ASID1, V1 (522,524)-ASID7, V7 (526, 528). The corresponding row in the data array 508 stores the corresponding 8 physical addresses shown as PA0 (530), PA1 (532)-PA7 (534).

Once the set 501 is selected, the stored virtual addresses 512-516 can be compared to the sought virtual address to determine whether any of the stored virtual addresses matches the sought virtual address With respect to the tag array 504, each stored virtual address is coupled to an associated comparator shown as 540, 542, 544 as shown by lines 546, 548, 550. The sought virtual address 536 is also coupled to each comparator 540, 542, 546. The outputs 552, 554, 556 of comparators 540, 542, 544 are coupled to AND gates 558, 560, 562 for logical combination with the output of the CAM array 506.

The CAM array 506 contains the ASID 518, 522, 526 and valid bits 520, 524, 528 associated with the selected page translation entry 501. Each stored ASID 518, 522, 526 is coupled to an associated comparator shown as 564, 566, 568 as shown by lines 570, 572, 574. The sought ASID 538 is also coupled to each comparator 564, 566, 568. The outputs 576, 578, 580 of comparators 564, 566, 568 as well as the valid bits 582, 584, 586 are coupled to AND gates 558, 560, 562 for logical combination with the output of the tag array 504. The output of AND gates 558, 560, 562 identifies a hit (e.g., a match between the sought virtual address and a stored virtual addresses, a match between the sought ASID and the stored ASID and a valid bit with a value of logic 1). Only one AND gate output will be active at any one time. The outputs 588, 590, 592 of AND gates 558, 560, 562 are coupled to select logic for outputting of the physical address from the data array 508. This is ensured by the insert logic only inserting an entry in the TLB for a given virtual address and ASID combination when a previous access to the TLB has shown that there is not an entry with that combination of virtual address and ASID already present in the TLB. The select logic comprises AND gates 594, 596 and 598 along with the OR gate 612.

The data array 508 stores the corresponding physical addresses associated with the selected page translation entry 501. The outputs 588, 590, 592 of AND gates 558, 560, 562 are coupled to AND gates 594, 596, 598. Each stored physical address is coupled to an input of an associated AND gate 594, 596 and 598 as shown by lines 600, 602, 604. The outputs 606, 608, 610 of AND gates 594, 596, 598 are coupled to OR gate 612. The output 614 of OR gate 612 is the physical address that corresponds the sought virtual address 536.

Figure 7B:
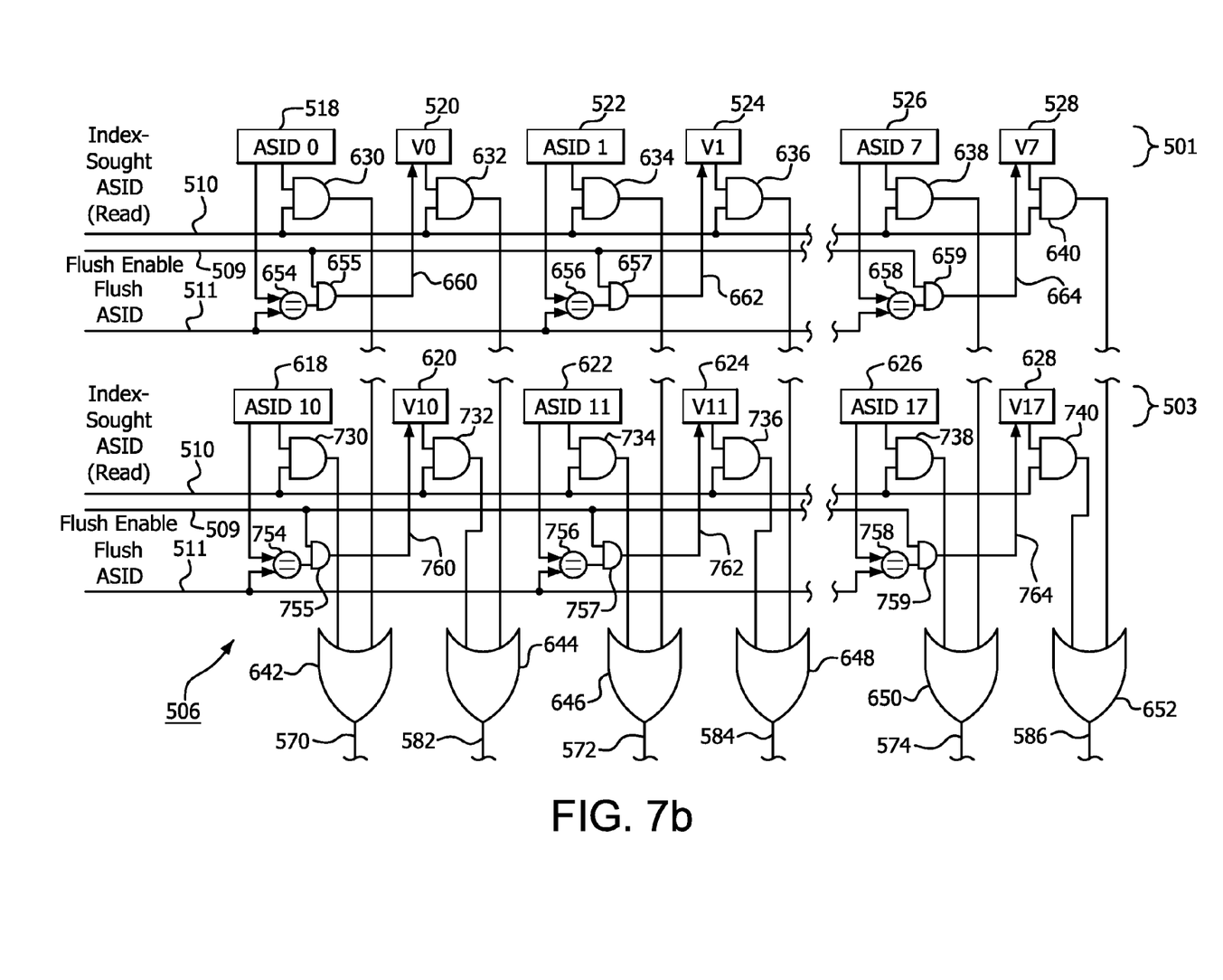
FIG. 7b is a block diagram of ASID based flush logic.

FIG. 7b is a detailed block diagram of flush logic configured to receive a TLB flush request from an operating system having an operating system ASID and flush only TLB page translation entries having a stored ASID that matches the operating system ASID. In this example a portion of the CAM array 506 is shown with additional detail. Each page translation entry within a set 501, 503 has a storage location for an ASID to indentify the specific operating system that inserted the entry with associated valid bits shown as ASID0, V0 (518,520), ASID1, V1 (522,524)-ASID7, V7 (526, 528). The CAM array 506 includes ASID read index inputs 510 (generated by decoder 502) and ASID flush inputs 511.

The TLB read logic includes a plurality of logic gates configured to generate ASID outputs 570, 572, 574 and a valid bit outputs 582, 584, 586. The ASID outputs are compared to the sought ASID via comparators 564, 566, 568 (FIG. 7a). If an ASID match is found and the associated valid bit is a logic 1 (indicating a valid entry), and a virtual address match is found (552, 554, 556), the physical address is output via output 614 (FIG. 7a). In more detail, if page set 501 is selected for a read operation by the assertion of the corresponding select line 510, AND gates 630, 634 and 638 output ASID 0 (518), ASID 1 (522) and ASID 7 (526) via OR gates 642, 646 and 650. Similarly, AND gates 632, 636 and 640 output valid bits V0 (520), V1 (524) and V7 (528) via OR gates 644, 648 and 652. If set 503 is selected for a read operation, AND gates 730, 734 and 738 output ASID 0 (618), ASID 1 (622) and ASID 7 (626) via OR gates 642, 646 and 650. Similarly, AND gates 732, 736 and 740 output valid bits V0 (620), V1 (624) and V7 (628) via OR gates 644, 648 and 652.

If set 501 is selected for a flush operation, comparators 654, 656, 658 compare the flush ASID 511 to ASID 0 (518), ASID 1 (522) and ASID 7 (526). If a match is found, and the flush enable signal 509 is activated, AND gates 655, 657, 659 activate the corresponding clear line 660, 662, 664 and the valid bits V0 (520), V1 (524) and/or V7 (528) are cleared. If page translation entry 503 is selected for a flush operation, comparators 754, 756, 758 compare the flush ASID 511 to ASID 0 (618), ASID 1 (622) and ASID 7 (626). If a match is found, and the flush enable signal 509 is activated, AND gates 755, 757, 759 activate the corresponding clear line 760, 762, 764 and the valid bits V0 (620), V1 (624) and/or V7 (628) are cleared. This configuration allows for flushing of only those TLB entries that match a specific flush ASID.

It should be understood that many variations are possible based on the disclosure herein. Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the present invention.

What is claimed is:

1. A translation lookaside buffer (TLB) configured for use with a plurality of virtual environments, the TLB comprising:
   a plurality of storage locations, each storage location being configured to store a page translation entry, each page translation entry relating a virtual address to a physical address, and each page translation entry having an address space identifier (ASID) associated with one of a plurality of virtual environments; and
   flush logic configured to receive a TLB flush request from a first of said plurality of virtual environments and to flush only TLB page translation entries having a stored ASID that matches the ASID of said first virtual environments;
   wherein the ASID is a multi-bit field having a plurality of values, wherein one of said values is assigned to one of the plurality of virtual environments and one of said values identifies the entry relating the virtual address to the physical address.

2. The TLB of claim 1 wherein the page translation entries are stored in a content-addressable memory format.

3. The TLB of claim 1 wherein the page translation entries are stored in an n-way set associative format.

4. The TLB of claim 1, wherein the plurality of virtual environments is selected from the group consisting of a plurality of operating systems; a plurality of virtual machines or virtual machine managers, a plurality of hypervisors and a plurality of virtual operating platforms.

5. The TLB of claim 1 wherein each page translation entry has an associated validity indicator.

6. The TLB of claim 5 wherein the flush logic flushes only page translation entries having a valid indicator.

7. The TLB of claim 1 further comprising insert logic configured to insert a page translation entry including an ASID.

8. The TLB of claim 7 wherein the insert logic is configured to insert page translation entries in a content-addressable memory format.

9. The TLB of claim 7 wherein the insert logic is configured to insert page translation entries in an indexed format.

10. A method of flushing a translation lookaside buffer (TLB) for use with multiple virtual environments, the method comprising:
    providing a plurality of storage locations, each storage location for storing a page translation entry configured to relate a virtual address range to a physical address range, each page translation entry having an address space identifier (ASID) associated with a virtual environment; and
    receiving a TLB flush request from a virtual environment having a virtual environment ASID and flushing only TLB page translation entries having a stored ASID that matches the virtual environment ASID;
    wherein the ASID is a multi-bit field having a plurality of values, wherein one of said values is assigned to one of the multiple virtual environments and one of said values identifies the entry relating the virtual address range to the physical address range.

11. The method of claim 10 wherein the page translation entries are stored in a content-addressable memory format.

12. The method of claim 11 further comprising providing a second level TLB configured to store page translation entries in an indexed format.

13. The method of claim 10 wherein the page translation entries are stored in an indexed format.

14. The method of claim 10 wherein the page translation entries are stored in an n-way set associative format.

15. The method of claim 10 wherein the multiple virtual environments is selected from the group consisting of a plurality of operating systems; a plurality of virtual machines or virtual machine managers, a plurality of hypervisors and a plurality of virtual operating platforms.

16. The method of claim 10 further comprising inserting a page translation entry including an ASID.

17. The method of claim 16 wherein the page translation entry is inserted in a content-addressable memory format.

18. A system comprising:
    a translation lookaside buffer (TLB), the TLB comprising:
    a plurality of storage locations, each storage location being configured to store a page translation entry configured to relate a virtual address range to a physical address range, each page translation entry having an ASID unique to one of a plurality of operating systems; and
    flush logic configured to receive a TLB flush request from an operating system and flush only TLB page translation entries having an ASID that matches the operating system ASID;
    wherein the ASID is a multi-bit field having a plurality of values, wherein one of said values is assigned to one of the plurality of operating systems and one of said values identifies the entry relating the virtual address to the physical address.

19. A non-transitory computer readable media including hardware design code stored thereon, and when processed generates mask works for a translation lookaside buffer (TLB) that is configured to flush TLB page translation entries in a multiple operating system environment, the method comprising:
- providing a plurality of storage locations, each storage location being configured to store a page translation entry configured to relate a virtual address range to a physical address range, each page translation entry having an address space identifier (ASID) associated with an operating system; and
- receiving a TLB flush request from an operating system having an operating system ASID and flushing only TLB page translation entries having a stored ASID that matches the operating system ASID;
- wherein the ASID is a multi-bit field having a plurality of values, wherein one of said values is assigned to one of the multiple operating systems and one of said values identifies the entry relating the virtual address to the physical address.

\* \* \* \* \*